J. A. MURPHEY.
AUTOMOBILE LOCK.
APPLICATION FILED APR. 5, 1921.
1,425,408.
Patented Aug. 8, 1922.
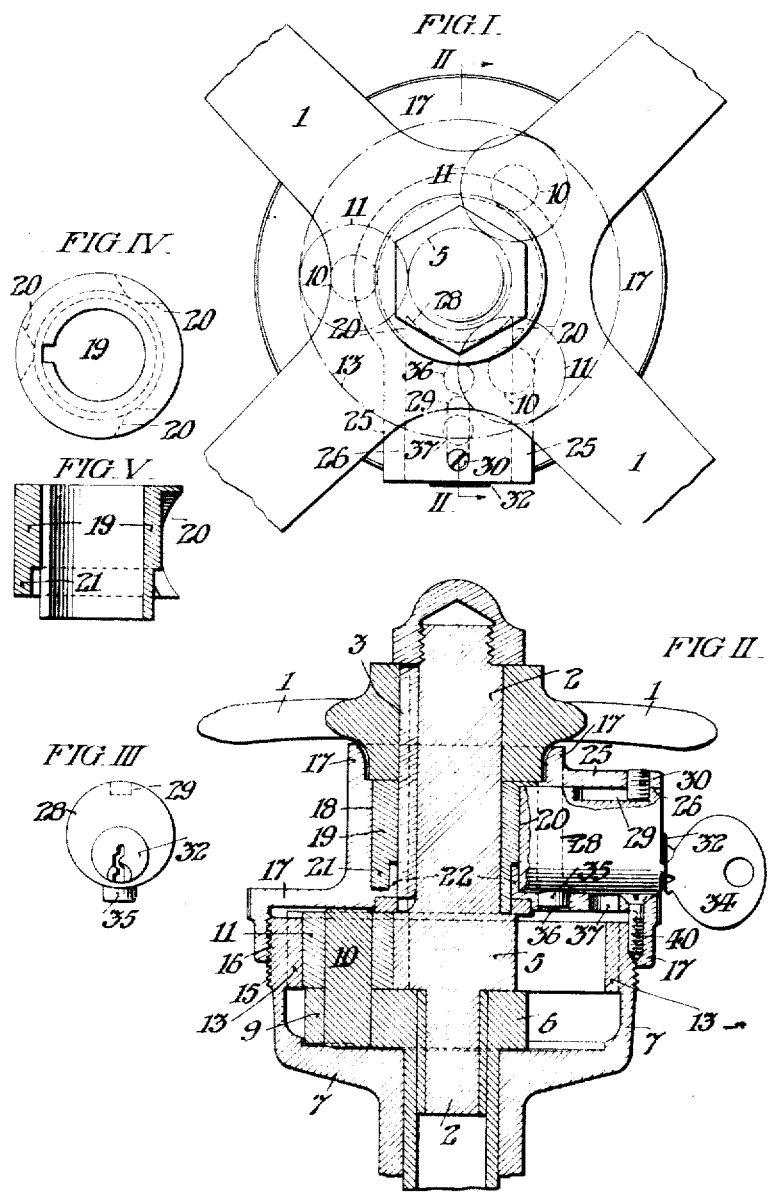
INVENTOR:
JAMES A. MURPHEY,

UNITED STATES PATENT OFFICE.

JAMES A. MURPHEY, OF PHILADELPHIA, PENNSYLVANIA.

AUTOMOBILE LOCK.

1,425,408.	Specification of Letters Patent.	Patented Aug. 8, 1922.

Application filed April 5, 1921. Serial No. 458,796.

*To all whom it may concern:*

Be it known that I, JAMES A. MURPHEY, a citizen of the United States, residing at Germantown, Philadelphia, in the State of Pennsylvania, have invented a certain new and useful Improvement in Automobile Locks, whereof the following is a specification, reference being had to the accompanying drawings.

My invention relates to locking means for detachably rigidly connecting the steering shaft of a self-propelled vehicle with the bearing tube inclosing said shaft so as to prevent the vehicle from being steered when locked; and preferably so constructed and arranged that the front wheels of such a vehicle may be turned at right angles to their normal position against a curb or similar obstruction before thus locking it, to prevent the vehicle from being towed.

As hereinafter described; my invention includes a lock, preferably of a "pin" key type, which may be permanently retained in connection with the vehicle but alternately in two positions, in both of which it is locked, but in only one of which it locks the vehicle.

Although my present invention is of the general class claimed in my Letters Patent of the United States No. 1,156,615 dated October 12, 1915, No. 1,366,206 dated January 18, 1921 and No. 1,367,200 dated February 1, 1921; it embodies improvements as to the specific construction and arrangement of the elements thereof whereby the lock casing is maintained in stationary position instead of being carried by the steering wheels as in the forms of my invention claimed in said Letters Patent. However, the claims in this case relate to the form of my invention shown in Fig. IX of said Letters Patent 1,366,206, officially held to be divisible from the subject matter of the claims of that Letters Patent. It may be observed that the construction shown in said Fig. IX and herein claimed, is advantageous, as compared with the structures claimed in said Letters Patent, in that the locking mechanism is prevented from turning with the rotary elements of the structure, to wit, the steering wheel, its shaft, etc., and is thus continuously maintained in a position accessible to the operator, whereas, in the structures claimed in said Letters Patent, the locking mechanism is carried around with the steering wheel and rendered difficult of access in some positions of the latter.

I have found it convenient to illustrate my invention with reference to an embodiment thereof in conjunction with a steering wheel and its appurtenances, of the present "Ford" type, and to form said lock casing in unitary relation with the cover of the internal gear case which is a stationary fixture at the top of the steering column. Such covers are screw threaded and, ordinarily, are removable at any time by merely rotating them. However, the form of my invention hereinafter described includes a detent which prevents the removal of the cover while the lock is in its casing; so that my improved lock is not only capable of preventing the vehicle from being steered, but also prevents removal of said cover when locked.

My invention includes the various novel features of construction and arrangement hereinafter more definitely specified.

In the drawings; Fig. I is a fragmentary, plan view of a steering wheel and its appurtenances, of the present "Ford" type, but includes a convenient embodiment of my invention, wherein the lock casing is in unitary relation with the internal gear case cover.

Fig. II is a fragmentary vertical sectional view of said structure, taken on the line II, II in Fig. I.

Fig. III is a front elevation of the "pin" key type lock indicated in Figs. I and II, but removed from its casing.

Fig. IV is a detached plan view of the locking sleeve shown rigidly connected with the drive pinion shaft in Fig. II.

Fig. V is a detached sectional view of said sleeve, similar to Fig. II, but with the key omitted.

In said figures; the rotary steering wheel 1 of the automobile is normally rigidly connected with the drive pinion shaft 2 by the key 3. Said shaft 2 has, in unitary relation therewith, the pinion 5, and its lower end is journaled in the drive pinion shaft bushing 6 which is rotatable in the internal gear case 7 and has, at its upper end, the arms 9 carrying respective stud shafts 10, parallel with said shaft 2. The planetary pinions 11 are mounted upon said stud shafts 10 in mesh with said pinion 5 and in mesh with the internal gear 13, which latter is formed in unitary relation with said case 7. Said internal gear case 7 has the external screw thread 15 engaging the internal screw thread 16 in the cover 17.

Said internal gear case cover 17 has the axial bore 18, concentric with the axis of said shaft 2, and fitted to the locking sleeve 19 which is rigidly connected with said shaft 2 by said key 3; so that said shaft is thus journaled in said cover 17. Said sleeve 19 has one or more locking recesses 20 and has the annular flange 21 overhanging the annular baffle flange 22 on said cover 17 so that the overlapped arrangement of said flanges makes it difficult for oil or other lubricant to leak out of said case 7.

Said internal gear case cover 17 also has, in unitary relation therewith, the lock casing 25 with the radial cylindrical lock socket 26, with which said locking recess 20 is adapted to register when the steering mechanism above described is turned to the position in which it is desired to lock the vehicle. The primarily separate lock 28 has a cylindrical body fitted to reciprocate in said lock socket 26; the extent of its reciprocation being limited by the slot 29 in which the screw 30 extends in rigid relation with said lock casing 25. So that, when in its inner position, shown in Figs. I and II, the inner end of said lock body 28 fits into said locking recess 20 in said sleeve 19 and prevents the rotation of said shaft 2 with which said sleeve is rigidly connected, and thus prevents operation of the steering mechanism. Said lock 28 has the rotary key barrel 32 which may be turned by the removable key 34 to project and retract the lock slide bolt 35. Said slide bolt 35 is thus adapted for detachable engagement in either of the detent recesses 36 and 37, to detain said lock body 28 in either its locked position shown or in its unlocked position. It is to be understood that when said key 34 is turned to retract said slide bolt 35 and the lock body 28 is withdrawn to the limit of its slot 29, said slide bolt 35 registers with said recess 37 and may be engaged therewith to hold said lock body 28 out of engagement with said locking sleeve 19 and thus permit the vehicle to be steered.

Said key 34 may be withdrawn from said lock whenever the lock bolt 35 is projected, but cannot be withdrawn from the lock when said bolt 35 is retracted and, consequently, serves as a handle by which said lock body 28 may be reciprocated. Of course, when said screw 30 is withdrawn from said slot 29; said lock body 28 may be withdrawn from its casing 25 in said cover 17; being thus separable as shown in Fig. III. However, in the ordinary use of this form of my invention, said screw 30 remains in the position shown in Fig. II, and said lock 28 is continuously carried in said cover 17 which, as above described, is stationary in the automobile.

Of course, unless means be provided to prevent rotation of said normally stationary cover 17 with respect to said stationary internal gear case 7, it might be unscrewed and removed with all of the locking mechanism aforesaid, thus permitting felonious steering of the vehicle by manipulation of the planetary gear mechanism above described. Therefore, I provide the detent screw 40 shown in Fig. II, which is in threaded engagement with both said case 7 and said cover 17 when the parts are in the assembled position shown; in which position the lock body 28 covers said screw 40 and prevents its withdrawal. However, when said lock 28 is removed from its casing 25, said screw 40 may be withdrawn conveniently by a screw driver inserted through the hole in which the screw 30 is normally seated; so that, when said screw 40 is withdrawn, said cover 17 may be rotated upon said case 7 and be thus unscrewed and removed.

Although I find it convenient to provide said cover 17 with the baffle flange 22 aforesaid, the construction may be simplified by omitting said flange and also omitting the flanged construction of said sleeve 19 which cooperates therewith as above described. Moreover, although I have found it convenient to illustrate my invention in connection with steering mechanism of the peculiar "Ford" type; it is to be understood that it is not limited to such an embodiment. Therefore, I do not desire to limit myself to the precise details of construction and arrangement herein set forth, as it is obvious that various modifications may be made therein without departing from the essential features of my invention, as defined in the appended claims.

I claim:

1. The combination with a normally rotary element and a stationary element of a vehicle; of two members respectively rigidly connected with said elements; said member connected with said stationary element having a lock casing socket; the other of said members having a locking recess arranged to register with said socket when said rotary member is turned; and a key lock including a body fitted to said casing socket and a bolt which may be set by the key of said lock to prevent disengagement of said lock and thus prevent relative rotation of said members; whereby said lock is prevented from turning with said rotary element and thus continuously maintained in a position accessible to the operator.

2. The combination with a normally rotary steering wheel and a stationary gear case; of a shaft rigidly connected with said wheel and having a sleeve with a locking recess; a cover for said gear case in which said sleeve is journaled and having a lock casing socket with which said recess is adapted to register when said wheel is turned; and a key lock including a body fitted to said casing socket and a bolt which may be set by the key of said lock to prevent disengagement of said lock and thus prevent rotation of said steering wheel shaft.

3. The combination with a normally rotary steering wheel and a stationary gear case; of a shaft rigidly connected with said wheel and having a sleeve with a locking recess; a cover for said gear case in which said sleeve is journaled and having a lock casing socket with which said recess is adapted to register when said wheel is turned; a key lock including a body fitted to said casing socket and a bolt which may be set by the key of said lock to prevent disengagement of said lock and rotation of said steering wheel shaft; screw threads on said case and cover, connecting them; and a detent screw extending from said lock socket in screw threaded engagement with both said case and said cover, normally preventing said cover from being unscrewed from said case; the arrangement being such that said lock body prevents withdrawal of said screw when in locked position.

4. The combination with a normally rotary steering wheel and a stationary gear case; of a shaft rigidly connected with said wheel and having a sleeve with a locking recess; a cover for said gear case in which said sleeve is journaled and having a lock casing socket with which said recess is adapted to register when said wheel is turned; a key lock including a body fitted to said casing socket and a bolt which may be set by the key of said lock to prevent disengagement of said lock and rotation of said steering wheel shaft; and a baffle flange on said cover engaging a flange on said sleeve, arranged to obstruct the escape of lubricant from said case.

5. The combination with a normally rotary steering wheel; of a stationary bearing having a lock socket; a shaft rigidly connected with said wheel, journaled in said bearing, and carrying a tubular member with a locking recess, arranged to register with said lock socket when said wheel is turned; and a key lock including a body fitted in said socket and operable to engage and disengage said recess and to prevent rotation of said shaft when engaged with said recess; whereby both said wheel and shaft are held stationary when said lock is engaged with said recesses.

In testimony whereof, I have hereunto signed my name at Philadelphia, Pennsylvania, this second day of April, 1921.

JAMES A. MURPHEY.

Witnesses:
ARTHUR E. PAIGE,
CAROLYN E. REUTER.